United States Patent
Halldorsson

(10) Patent No.: US 6,412,949 B1
(45) Date of Patent: Jul. 2, 2002

(54) SYSTEM AND METHOD FOR STEREOSCOPIC IMAGING AND HOLOGRAPHIC SCREEN

(75) Inventor: Thorsteinn Halldorsson, Münich (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/744,543

(22) PCT Filed: May 12, 2000

(86) PCT No.: PCT/DE00/01511

§ 371 (c)(1),
(2), (4) Date: Jan. 25, 2001

(87) PCT Pub. No.: WO00/73825

PCT Pub. Date: Dec. 7, 2000

(30) Foreign Application Priority Data

May 26, 1999 (DE) ........................... 199 24 096

(51) Int. Cl.⁷ ..................... G03B 21/14; G03B 21/56
(52) U.S. Cl. ........................ 353/8; 359/23; 359/464; 359/458
(58) Field of Search ................ 353/7, 8, 10; 359/10, 359/23, 22, 28, 458, 464, 465, 477; 348/54, 58, 60; 349/15

(56) References Cited

U.S. PATENT DOCUMENTS

| | | | | |
|---|---|---|---|---|
| 5,469,295 A | * | 11/1995 | Burke | 353/10 |
| 5,506,701 A | * | 4/1996 | Ichikawa | 359/15 |
| 5,564,810 A | | 10/1996 | Larson | 353/8 |
| 5,694,164 A | | 12/1997 | Choi | 348/57 |
| 5,760,954 A | | 6/1998 | Tatsuki et al. | 359/452 |
| 5,886,816 A | * | 3/1999 | Faris | 359/464 |
| 5,953,156 A | * | 9/1999 | Muench | 359/464 |
| 6,191,876 B1 | * | 2/2001 | Popovich | 359/15 |
| 2001/0006426 A1 | * | 7/2001 | Son et al. | 359/15 |
| 2002/0005820 A1 | * | 1/2002 | Son et al. | 345/8 |

FOREIGN PATENT DOCUMENTS

| | | |
|---|---|---|
| DE | 19700162 | 7/1998 |
| DE | 19704740 | 8/1998 |
| GB | 2211375 | 6/1989 |

* cited by examiner

Primary Examiner—William C. Dowling
(74) Attorney, Agent, or Firm—Ladas & Parry

(57) ABSTRACT

A system for stereoscopic image display includes a projection device (2) with modulators (21, 22) and a polarization splitter prism (3) for the projection of images with differing perspectives each with differing polarization directions. A holographic screen (1) has a grid structure that corresponds to a hologram recording of actual screens with differing polarization directions. The incident light beams (A, B) have the effect that two differently polarized images are generated on the holographic screen (1), where said images can be perceived separately by the left and the right eye by using eyeglasses (5) with polarization filters.

21 Claims, 2 Drawing Sheets

SYSTEM AND METHOD FOR STEREOSCOPIC IMAGING AND HOLOGRAPHIC SCREEN

BACKGROUND OF THE INVENTION

The invention relates to a system and a method for stereoscopic image display as well as to a holographic screen.

It is generally known that spatial images of objects can be generated on image areas using holographic and stereoscopic methods.

With holography, it is possible to store the entire information using the amplitudes and phases of light-waves originating from an object, and thus, the information regarding its spatial shape, as a two-dimensional grid structure in a hologram film.

The waves that originated from the object and that also contain as image information the spatial structure of the object can now be reproduced as an image area by the diffraction of a projection beam onto the grid structure of the film.

With stereoscopy, the spatial structure is recorded using conventional photography of the object from different directions that correspond, for example, to the distance between the eyes of the viewer. For the spatial impression of the images of an object to be projected onto a screen to come into existence, it has to be ensured that the left eye sees only the left image and the right eye only the right image. As is known, this is made possible either by both images being vertically polarized to one another or by having the images projected onto the screen in rapid succession with a time shift. In order to see the image spatially, the viewer must wear eyeglasses; in the first case, with glasses that allow waves to pass that are polarized vertically left and right to one another, and in the second case, with glasses that are equipped with time-controlled shutters that open synchronously with the image, alternating for light passage on the left and the right eye.

With auto-stereoscopy, one can forego the stereo eyeglasses because the different images for the left and the right eye are carried out by narrowing the angle of the light emission from the screen. However, this requires that the eyes view the image at a particular distance from the screen, or that the eye position in relation to the screen is continuously monitored and that the emission characteristic is readjusted according to the eye position of the viewer, which requires a significant effort.

The holographic method that enables a spatial view of objects in various perspectives over a wide range of angles both in the horizontal and vertical direction has the disadvantage that there is a very high information density in the hologram. It is greater by a factor of 1000 compared to a typical two-dimensional display on current screens. The technology of a three-dimensional electronic display of holographic moving images is, therefore, not yet mastered.

Stereoscopy and auto-stereoscopy enable spatial images only in the horizontal plane and viewing of the object only from a fixed viewing angle. The autostereoscopy is a very involved method and is only employed for individual viewers in close proximity to the screen with a defined head distance and head position. On the other hand, the stereoscopy using stereo eyeglasses could be realized in various versions, for example, in film technology for full-color slide projection and in 3-D movie theaters, as well as in the electronic image technology for visualizing 3-D graphics and 3-D videos. This is due to the simple technical implementation and the limited number of additional requirements with regards to information density, which here is greater by a factor of 2 when compared to a typical two-dimensional image display. Despite the limitation of a stationary viewing location and viewing angle, the stereoscopic image generation is widely used in the entertainment industry and in simulation technology. Using fast, modern computers and motion sensors that continuously register the viewer's body and head movements as well as a corresponding image adaptation in the computer, a spatial impression of the environment and the objects (virtual reality) can be generated in all directions using stereoscopic projection. Using sensor gloves that are connected to the computer, the viewer can then interact with the objects and functions of this virtual world.

With these latest new achievements of electronic stereoscopic image display, a broad field of application has been developed for this technology in a short time, despite the handicap of wearing polarization eyeglasses (shutter glasses). Among these applications are training of surgeons using virtual operations, astronauts assembling virtual spatial structures, training of vehicle conductors and airplane pilots, and dynamic visualization of the outside and inside of virtual buildings and vehicles, which is important for architects or vehicle designers and their customers.

In contrast to the holographic and the auto-stereoscopic image display, which will only achieve the required technical development and cost advantages in the distant future, a very rapid distribution of the electronic stereoscopic image display in conjunction with the development of powerful image computers is to be expected in the near future for a broad spectrum of applications.

Currently, however, the stereoscopic projection still suffers from numerous problems and disadvantages. Primarily, these problems are low sensitivity, lack of image sharpness, low image contrast and inadequate color fidelity in relation to external light. It is generally known that a good image quality for slide presentations or in a movie theater is achieved only in darkened rooms. Any external light will also be rayed to the viewer from the screen, and is added to the effective light portion of the image, which leads to a lower contrast and reduction in the color saturation.

A second problem is the mutual interference of the images during projection. This is especially the case with concave screens that are used to fill the visual field of the viewer as much as possible, or in closed projection rooms with screens on all sides around the viewer, the so-called "caves" for the image display of the virtual reality. In these situations, the light from one side of the screen is scattered to the other side and is added to the effective light of the image, causing the same reduction in quality as with additional daylight.

SUMMARY OF THE INVENTION

It is the objective of the invention to enable a stereoscopic image display that ensures a high image quality especially for moving images and that can be realized easily and cost-effectively.

The system for stereoscopic image display subject to the invention includes a projection device for the projection of two images with different perspectives, a projection screen to reproduce the images, and a device for the separate viewing of the two images with the left eye and the right eye, where the projection device includes means for generating projection beams with differing polarization directions, and where the projection screen is a holographic screen with a grid structure that causes two differently polarized images to be generated when struck by light beams with two different polarization directions. This results in a high image contrast with high color fidelity for the stereoscopic display. Especially, a cross-interference of various image portions is avoided, because only the light coming from the projection device is reflected by the respective image point.

The holographic screen subject to the invention for the stereoscopic image display includes a hologram, whose grid structure corresponds to a hologram recording of an actual screen, where the grid structure corresponds to a hologram recording with a defined polarization direction or several hologram recordings with two polarization directions that are perpendicular to one another. In this manner, it is particularly well suited for the stereoscopic image projection or reproduction, whereby a high image quality is achieved.

BRIEF DESCRIPTION OF THE DRAWING

The method subject to the invention for stereoscopic image display comprises the steps: Generating light beams with two different polarization directions for projecting images of different perspectives and guiding of the differently polarized light beams onto a holographic screen that has a grid structure that corresponds to a holographic recording of an actual screen and that is designed such that it causes two differently polarized images to be generated when struck by light beams with two different polarization directions. This allows for the possibility for a stereoscopic reproduction of images, particularly of moving images or videos with a high brightness and color fidelity in a cost-effective manner.

In the following, the invention is described using the drawings, wherein.

DETAILED DESCRIPTION

Figure 1:
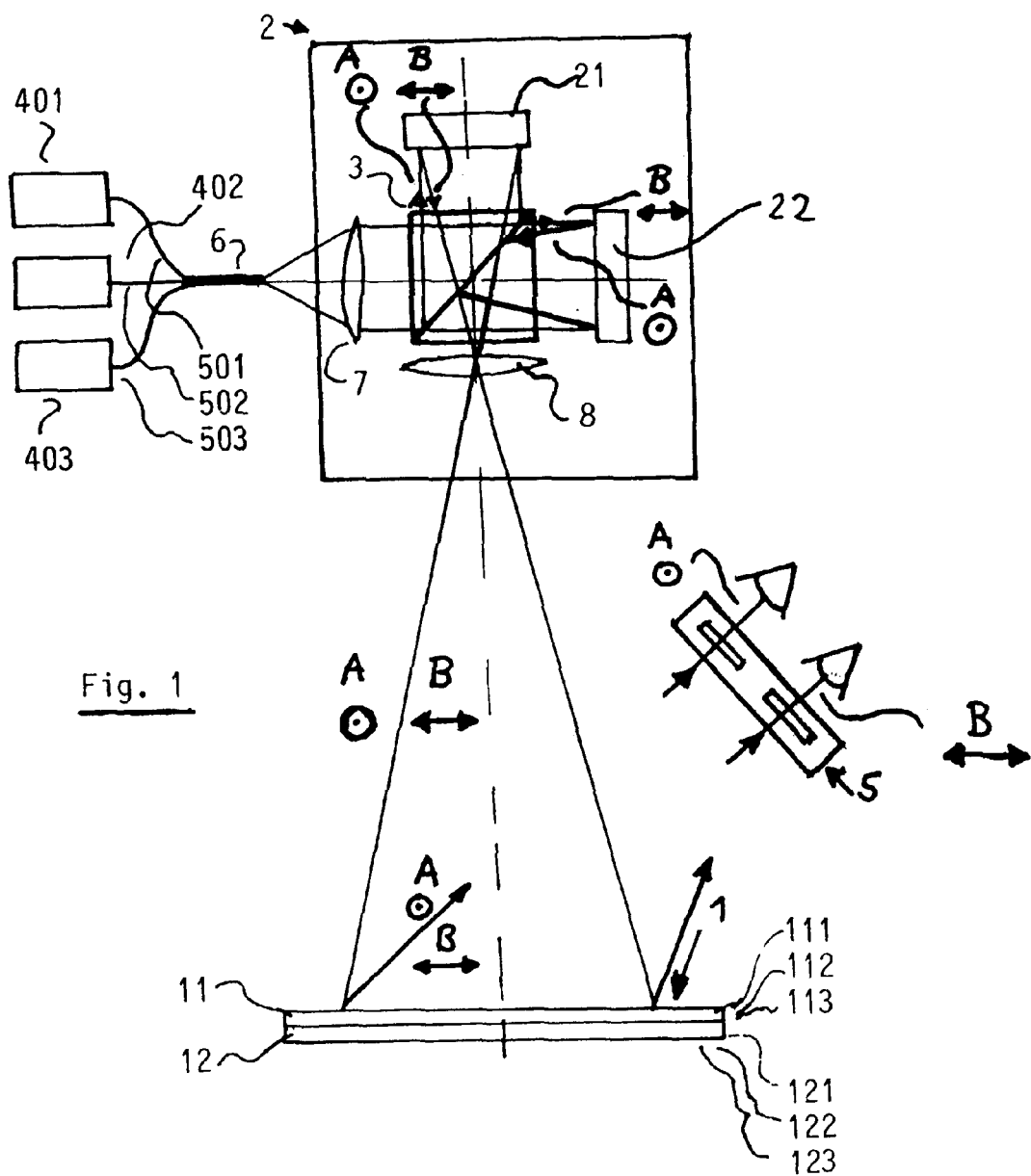
FIG. 1 schematically shows a first preferred embodiment of the invention.

FIG. 1 shows schematically a sectional view of a preferred embodiment of the invention. A projector 2 comprises reflection modulators 21 and 22, as well as a polarization splitter prism 3. Three rgb lasers 401–403 generate light beams that comprise the three primary colors. The light beams are guided to the polarization splitter prism 3 in a collimated, non-polarized manner, and split by the prism into two orthogonal partial beams A and B. According to their respective polarization direction, the two partial beams A, B are each guided to the corresponding reflection modulator 21 or 22. In the Figure, the beams with the designation A are polarized perpendicular to the image plane. The image modulation of each of the partial beams A and B is carried out by orthogonal rotation of the polarization direction of the beams reflected at the modulator 21, 22. Ferro-electric liquid modulators, for example, can be used as reflection modulators. The light beams with rotated polarization direction reflected by the modulators 21, 22 arrive at a holographic screen 1 via the polarization splitter prism 3 and a lens 8. Each modulator is controlled by image information such that two images with different perspectives and polarization directions are being projected.

The holographic screen 1 contains a hologram of an actual screen that has, however, been generated such that the incident light beams with a defined polarization direction cause images to come into existence whose polarization direction corresponds to that of the incident light beams. This special characteristic can be achieved through special measures during the manufacturing process of the holographic screen, which will be described in greater detail below.

The holographic screen 1 consists of one or more holographic reproductions of actual screens. The generation of holographic screens through hologram recordings of actual screens is described in the patent applications DE 197 00 162, DE 197 03 592 and 197 04 740. A screen or a canvas is used for a hologram recording. The holographic screen 1 according to the present invention contains a superimposition of two independent images of the same canvas or of the same actual screen in the same hologram, where the images have been taken with two laser light waves (reference and object light) polarized orthogonally to one another. When illuminating the holographic screen 1 that contains the double screen hologram with the two projection beams with orthogonal polarization directions, images that are orthogonally polarized to one another appear for the viewer of screen 1. The superimposed pictures with their differing polarization directions are again split by a viewing device 5 that contains, for example, two polarization filters for different polarization directions, such that a viewer sees one of the two separate pictures with the left eye and the other with the right one.

In the present case, the holographic screen 1 has two polarized screen image groups 11, 12, or holograms, each of which contains a red, green and blue color image 111, 112, 113, or 121, 122, 123 of a single screen.

The image modulation of each of the partial beams in the modulators 21, 22 can be carried out simultaneously or successively for the various colors.

The three rgb laser beams are combined onto one common fiber 6 using fiberoptic elements 501–503. A collimator lens 7 bundles the beams together onto the splitter prism 3.

Figure 2:
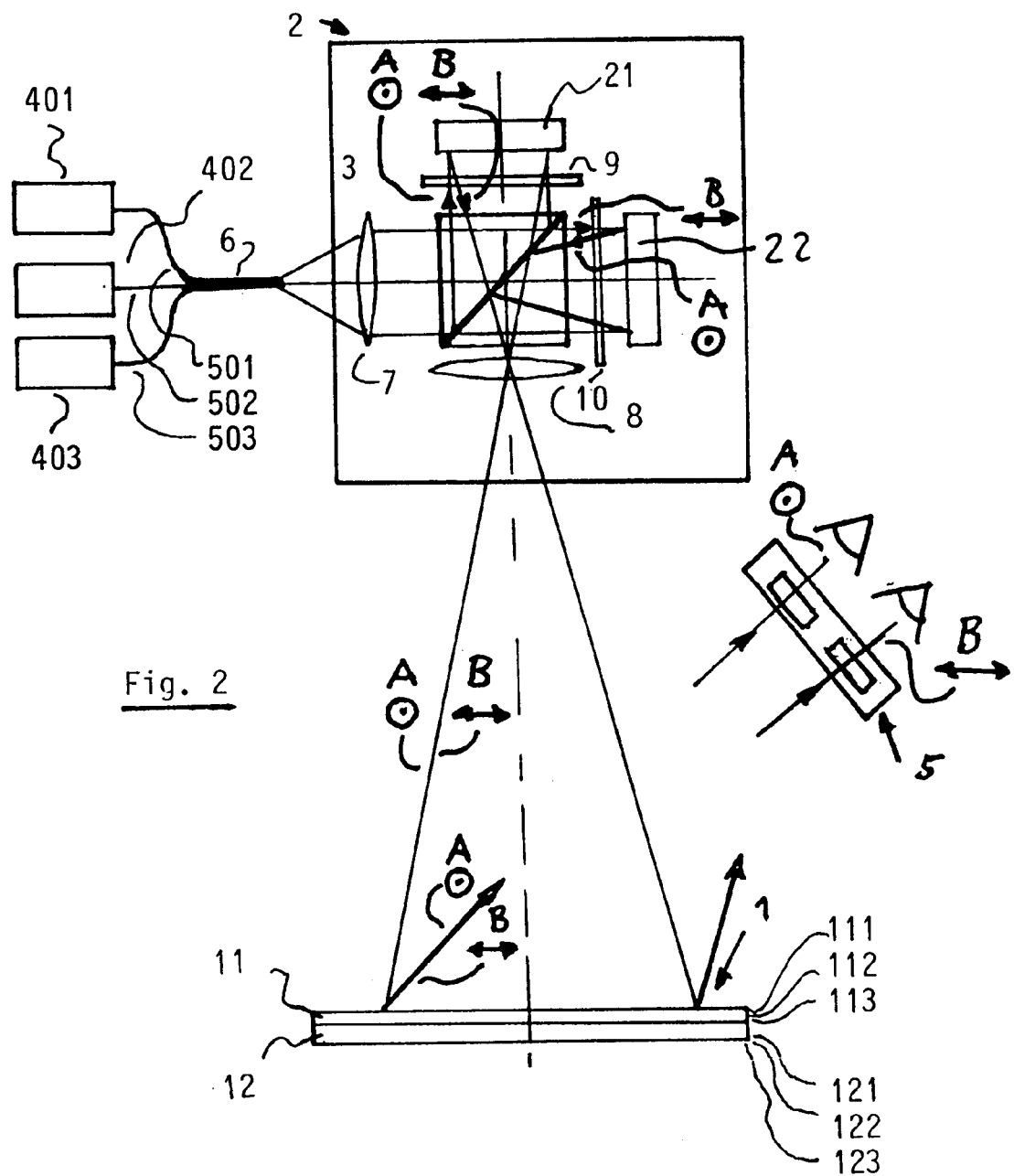
FIG. 2 schematically shows a second preferred embodiment of the invention using quarter-wave plates.

FIG. 2 shows another embodiment of the invention, whereby similar components have the same reference character as those in FIG. 1. However, in place of the reflection modulators 21, 22 of FIG. 1, here modulators 21', 22' are used that do not change the polarization direction of the incident beam but modulate, or switch on and off, the intensity of the reflected beam. Such modulators are known as digital micro-mirror devices (DMD). However, in this case, it is provided that each modulator 21', 22' has a quarter-wave plate 9, 10 connected in the incoming path, where each said quarter-wave plate circularly polarizes the original linear polarization direction in the first pass, and turns it orthogonally to the original polarization direction in the second pass after the reflection at the modulator 21' or 22'.

After the modulation to the polarization direction of the screen images, the orthogonal orientation of the polarization in the beam path as well as the lenses in the eyeglasses of the viewer, or the viewing device 5 are attuned to one another. The two orthogonally polarized projection beams A and B run overlapping and with the same optical axis to the projection on the holographic screen 1. The image offset due to the perspective difference for the stereo projection is not shown in the Figures.

Instead of generating the holographic screen through hologram pictures of the actual screens or canvasses, it can also be generated by a computer. In this case, the grid structure is calculated such that it corresponds to a hologram recording of a screen, particular with regard to polarization direction, wavelength and color. Using an illumination device, this calculated grid structure is then stored in the hologram layer.

Thus, the holographic screen 1 contains holographic recordings of actual screens, with the particular characteristic that, using front-projection, it only backscatters a narrow-band radiation of the primary colors red, green and blue, preferably from lasers, or it forwardscatters it when using rear-projection. The following condition must be satisfied, the projection beam strikes the hologram from the same direction as the reference beam during the recording of the hologram. Thus, the holographic screen 1 has the characteristic that both the broad-band surrounding light and the projector light from all other incident directions passes through the hologram without obstruction, and in this way no longer has an influence on the image generation through the narrow-band rgb projector 2 on the screen 1.

The spatial reproduction of the screen is first created when the hologram is illuminated from the certain direction. In the spirit of the above-mentioned invention, the reproduction of the screen should preferably lie in the hologram plane. If the projection beam is now modulated using information, a superimposition of this modulated image with the image of the screen is created in the hologram plane. The image of the screen has a significantly higher information density than the incident modulated image. Since the surface structure of the screen is significantly greater than that of the image element size, only the rgb image becomes visible to the viewer. To transmit a moving image to the viewer, only a small transmission width is required as with common 2-D images, because the holographic image of the screen remains stationary with every change in the image.

Since the image of the screen in holographic screen 1 remains unchanged every time there is a change in the projected image, a high information density is nor required to reproduce a holographic image display of the area-like image information that is impressed on the projection beam. The reproduction of the backscattering or the forwardscattering characteristics of the screen can be utilized in the hologram during the image projection. The combination with the wavelength and direction selectivity that is characteristic for the holographic picture is used to generate full-color images independent of influencing light.

With the holographic screen 1, the superimposition of two independent images of the same screen in the same hologram is used, where the images have been taken with two laser light waves (reference and object light) polarized orthogonally to one another.

When illuminating the double screen hologram with the two projection beams with orthogonal polarization directions, such as during recording, it is possible to have images that are orthogonally polarized to one another appear on the screen for the viewer. If the viewer wears eyeglasses with polarized lenses, that allow the one and the other polarization direction, respectively, to pass through, then the viewer's left eye will see the one image and the right eye the other image independent of one another. Through the stereoscopic projection, the two images together provide the viewer with the spatial impression of the recorded object.

The holographic screen 1 for the reproduction of orthogonally polarized stereo images can be designed in various manners. Alternatively, as the hologram of a front-projection screen or of a rear-projection screen, as well as recorded in the two-step recording method, that is, only after recording a master hologram and in the second step, thereafter, by recording another reproduction of the actual image of the first master hologram. Preferably, the recording is done in such a manner that the screen image lies in the hologram plane at the end, or near or in the hologram plane to achieve an as big as possible emission angle and a good resolution.

After recording, the hologram can be placed against a black, light-absorbing background. In this manner, the projected images achieve the highest contrast, because the interfering light that passes through is absorbed in the background. On the other hand, if the screen hologram is transparent, the virtual 3-D images appearing in it can be mixed with, for example, actual objects standing behind or in front of the hologram.

Aside from the exposure of two orthogonally polarized reproductions, the method of multiple exposure of the same screen in one single hologram can here be expanded further to the recording of all three r,g,b colors in one single hologram simultaneously. This hologram now exposed six times, harbors simultaneous reproductions of six independent screens with differing combinations of color and polarization orientation, such that all color and polarization information of the stereo projector can be reproduced simultaneously.

It is also possible, to record each polarization direction in separate layers which are laminated to one another. Other variations such as the combining of up to 6 separate layers are possible as well.

It is understood that the two orthogonal polarization directions of the projector must be parallel to the two orthogonal polarization directions in the screen as well as to the polarization direction of the eyeglasses of the viewer in order to obtain a good reproduction quality.

However, alternatively to recording two screens with orthogonal polarization directions, it is also possible to use a single holographic screen 1 with a fixed polarization device that is rotated by 45° both versus the orthogonal polarization direction of the incident waves, as well as by 45° versus that of the eyeglasses. In this case, the two incident waves will be backscattered from the screen in equal parts with their original polarization direction.

As presented in FIGS. 1 and 2 the orthogonal orientation of the polarization in the beam path after the modulation is adjusted to the polarization directions of the screen images and the polarization direction in the lenses of the eyeglasses of the viewer. Also presented are two orthogonally polarized projection beams that run overlapping with the same optical axis on the screen 1. Not shown is the image offset that is due to the perspective difference for the stereo projection.

What is claimed is:

1. In a system for stereoscopic image display, having
    a projection device for projecting two images with different perspectives,
    a projection screen to reproduce the images, and
    a device for separate viewing of the two images with a left eye and a right eye of a viewer,
    the improvement wherein:
        said projection device includes means for generating projection beams with differing polarization directions, and said projection screen comprising a holographic screen with a grid structure that causes two differently polarized images to be generated when struck by light beams with two different polarization directions.

2. The system of claim 1, wherein the holographic screen comprises two holograms of actual screens with polarization directions that are perpendicular to one another such that the polarization directions of the holograms correspond to the polarization directions of the incident light beams.

3. The system of claim 1, wherein the holographic screen comprises a hologram of an actual screen with a polarization direction that is offset 45° from an orthogonal polarization direction of the incident light beams.

4. The system of claim 1, wherein said holographic screen comprises one or more holographic recordings of an actual screen with at least one defined polarization direction.

5. The system as claimed in claim 1, wherein said holographic screen comprises a computer-generated grid structure that corresponds to the grin structure of a hologram recording of an actual screen.

6. The system of claim 1, wherein said projection device includes a polarization splitter prism and reflection modulators arranged orthogonally to one another.

7. The system of claim 1, wherein said projection device includes intensity modulators each with a quarter-wave plate.

8. The system of claim 1, wherein said holographic screen is located in front of a light-absorbing background.

9. The system of claim 1, wherein said holographic screen is transparent to enable a subject located behind or in front of the screen to be visible during image projection.

10. The system of claim 1, wherein said grid structure of the holographic screen is constituted so that with a defined viewer position and a defined position of the projection device a hologram object becomes visible, while light beams that strike the screen from a different angle pass through the screen without generating an image.

11. The system of claim 1, wherein said holographic screen comprises a hologram recording having a defined polarization direction.

12. The system of claim 1, wherein said screen has a plurality of hologram recording having polarization directions perpendicular to one another.

13. A holographic screen of stereoscopic image display comprising a hologram having a grid structure which corresponds to a hologram recording of an actual screen, in which the hologram recording has a defined polarization direction.

14. The holographic screen display system of claim 13, wherein a plurality of said hologram recordings are provided having two polarization directions that are perpendicular to one another.

15. The holographic screen display system of claim 14, wherein said hologram contains two independent images of the same canvas or the same screen that have been recorded with light-waves that are orthogonally polarized to one another or that have been computer-generated correspondingly.

16. The holographic screen display system of claim 13, wherein said hologram comprises a plurality of layers with screen holograms of differing polarization directions.

17. The holographic screen display system of claim 16, wherein said hologram comprises a plurality of layers with screen holograms of differing polarization directions.

18. The holographic screen display system of claim 16, wherein said layers of said holograms each has different polarization direction or color or both.

19. The holographic screen display system of claim 13, comprising a hologram layer that has been exposed several times, such that differing polarization directions or different colors or both are stored in the hologram layer.

20. A method for stereoscopic image display comprising:

generating light beams having two differing polarization directions for the projection of images with differing perspectives, and transmitting the differently polarized light beams onto a holographic screen that has a grid structure that corresponds to a hologram recording of an actual screen and wherein the holographic screen produces two differently polarized images when struck by light beams with two different polarization directions.

21. The method of claim 20, wherein said holographic screen is formed with holograms having different polarization directions.

\* \* \* \* \*